United States Patent
Rosenberry et al.

(10) Patent No.: US 10,069,763 B2
(45) Date of Patent: Sep. 4, 2018

(54) METHOD TO ESTABLISH A NON-DISRUPTIVE COMMUNICATIONS PATH BETWEEN MULTIPLE DEVICES

(71) Applicant: NetScout Systems, Inc., Westford, MA (US)

(72) Inventors: Steven M. Rosenberry, Reading, PA (US); Patricia D. Littleton, Marlton, NJ (US); David L. Sclarsky, Cherry Hill, NJ (US)

(73) Assignee: NetScout Systems, Inc., Westford, MA (US)

( * ) Notice: Subject to any disclaimer, the term of this patent is extended or adjusted under 35 U.S.C. 154(b) by 172 days.

(21) Appl. No.: 15/159,519

(22) Filed: May 19, 2016

(65) Prior Publication Data

US 2017/0331725 A1 Nov. 16, 2017

Related U.S. Application Data (60) Provisional application No. 62/334,284, filed on May 10, 2016.

(51) Int. Cl.
| | | |
|---|---|---|
| *H04L 12/937* | (2013.01) | |
| *H04L 12/721* | (2013.01) | |
| *H04L 12/715* | (2013.01) | |
| *H04L 12/703* | (2013.01) | |

(52) U.S. Cl.
CPC ............ *H04L 49/253* (2013.01); *H04L 45/38* (2013.01); *H04L 45/64* (2013.01); *H04L 45/28* (2013.01)

(58) Field of Classification Search
CPC ............................... H04L 45/26; H04L 49/253
USPC ................................................... 370/389, 392
See application file for complete search history.

(56) References Cited

U.S. PATENT DOCUMENTS

| | | | |
|---|---|---|---|
| 8,644,149 B2 | 2/2014 | Yedavalli | |
| 2002/0003804 A1* | 1/2002 | Hjalmtysson | ....... H04L 49/3081 370/410 |
| 2008/0239945 A1* | 10/2008 | Gregg | ................. G06F 11/2005 370/217 |
| 2013/0128746 A1* | 5/2013 | Yedavalli | ................. H04L 45/38 370/238 |
| 2015/0271081 A1* | 9/2015 | Arumilli | ................. H04L 47/11 370/235 |

(Continued)

*Primary Examiner* — Chuong T Ho
(74) *Attorney, Agent, or Firm* — Locke Lord LLP; Scott D. Wofsy; Christopher J. Capelli (57) ABSTRACT

A method for establishing a communications path is provided. A routing path between a source port on a source switch and a destination port on a destination switch through intermediate switches is identified. A first message is sent to the source switch, the destination switch and the intermediate switches instructing the recipient switches to prepare for establishing a connection. In response to receiving a first set of acknowledgment messages from the recipient switches, a second message is sent to the destination switch and the intermediate switches instructing these switches to establish a connection to the destination port along the identified routing path. In response to receiving a second set of acknowledgment messages from the destination switch and each of the intermediate switches, a third message is sent to the source switch instructing it to establish a connection between the source port and the established connection to the destination port.

17 Claims, 3 Drawing Sheets

(56) References Cited

U.S. PATENT DOCUMENTS

| | | | |
|---|---|---|---|
| 2016/0050131 A1* | 2/2016 | Zhang | H04L 43/0811 370/244 |
| 2016/0248664 A1* | 8/2016 | Huang | H04L 45/64 |
| 2017/0195229 A1* | 7/2017 | Ulas | H04L 47/122 |

* cited by examiner

METHOD TO ESTABLISH A NON-DISRUPTIVE COMMUNICATIONS PATH BETWEEN MULTIPLE DEVICES

CROSS REFERENCE TO RELATED APPLICATIONS

This application claims the benefit of the filing date of U.S. Provisional Patent Application Ser. No. 62/334,284 titled "Methods to Establish a Non-Disruptive Communication Path Between Multiple Devices" and filed May 10, 2016.

FIELD OF THE INVENTION

Embodiments of the present invention relate to computer networks, and particularly to establishing a non-disruptive communications path between multiple network devices.

BACKGROUND OF THE INVENTION

Figure 1:
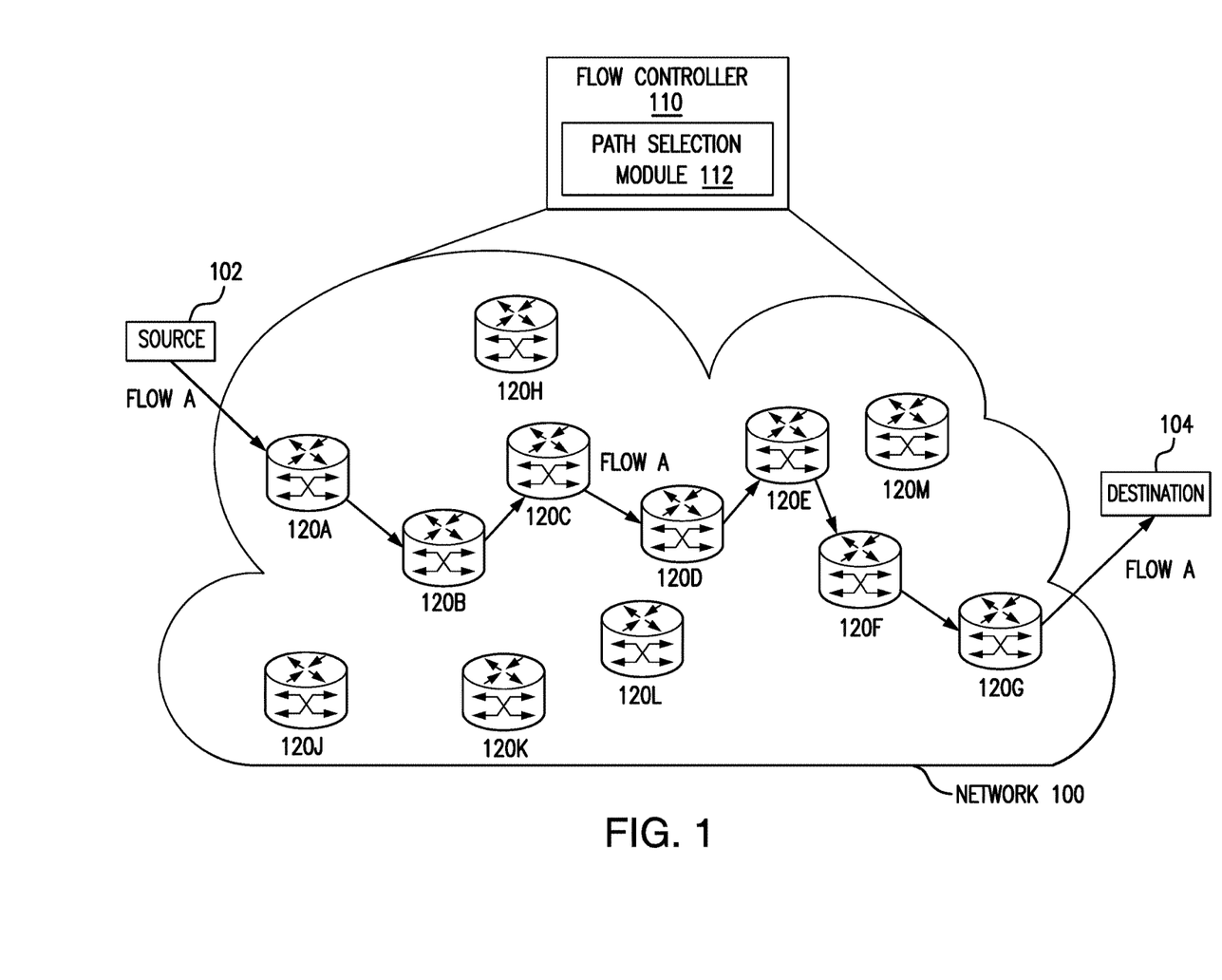
FIG. 1 illustrates an exemplary flow-based, split-architecture network.

A split architecture network is an alternate paradigm for network architecture. A split architecture network is composed of a number of nodes, such as routers or switches, like traditional network architecture. However, in this paradigm, the control plane functionality of the network can reside at a single central controller that can be in a single node of the network as illustrated in FIG. 1. This is in contrast to traditional network architecture where the control plane functionality resides on every node in the network. In a split architecture network, the network nodes are stripped of their control plane functionality and provide basic data plane functionality as 'flow switches.' A 'domain,' as used herein, is an area of a split architecture network where the flow switches are under the control of a single controller.

An example of a split architecture network is an OpenFlow based split architecture network. In an OpenFlow split architecture network, a controller and the flow switches in the data plane communicate using an OpenFlow Protocol. The OpenFlow protocol provides message infrastructure for the controller to program the flow switches in the data plane with appropriate flows for packet forwarding and processing. The controller can also obtain complete network state information for the network by querying each of the network nodes. This single logical OpenFlow controller can be implemented as a set or cluster of controllers responsible for a single domain of switches.

However, a wide range of network threats and situations can lead the split architecture network to fail or provide a defective service, impeding its normal operation. In addition to network security, the split architecture should ensure network-wide data confidentiality, authentication and integrity, and should be aimed at providing enhanced network security and availability, not only during normal operation but, also under different attacks, such as routing attacks or Denial of Service (DoS) attacks. Furthermore, new vector attacks and effects of existing threats have to be minimized. Also, even a minor information leakage (via device compromise, for example) could greatly compromise security.

It is desired to implement methods and procedures that non-disruptively connect two data ports using communications paths between multiple devices in split architecture networks in a manner that is very secure against outside attackers.

SUMMARY OF THE INVENTION

The purpose and advantages of the illustrated embodiments will be set forth in and apparent from the description that follows. Additional advantages of the illustrated embodiments will be realized and attained by the devices, systems and methods particularly pointed out in the written description and claims hereof, as well as from the appended drawings.

In accordance with a purpose of the illustrated embodiments, in one aspect, a method in a switching network for establishing a communications path is provided. A routing path between a source port on a source switch in communication with an external source node and a destination port on a destination switch in communication with an external destination node is identified in a flow controller. A first message is sent to the source switch and the destination switch by the flow controller. The first message instructs the recipient switches to prepare for establishing a connection. In response to receiving a first set of acknowledgment messages from the source switch and the destination switch, a second message is sent to the destination switch by the flow controller. The second message instructs the destination switch to establish a connection to the destination port along the identified routing path. In response to receiving a second set of acknowledgment message from the destination switch, a third message is sent to the source switch by the flow controller. The third message instructs the source switch to establish a connection between the source port and the established connection to the destination port along the identified routing path.

In another aspect, a method in a switching network including a plurality of switches for establishing a communications path is provided. A routing path between a source port on a source switch in communication with an external source node and a destination port on a destination switch in communication with an external destination node is identified in a flow controller. The path extends from the source switch to the destination switch through one or more intermediate switches. A first message is sent to the source switch, the destination switch and the one or more intermediate switches by the flow controller. The first message instructs the recipient switches to prepare for establishing a connection. In response to receiving a first set of acknowledgment messages from the source switch, the destination switch and each of the one or more intermediate switches, a second message is sent to the destination switch and the one or more intermediate switches by the flow controller. The second message instructs the destination switch and the one or more intermediate switches to establish a connection to the destination port along the identified routing path. In response to receiving a second set of acknowledgment messages from the destination switch and each of the one or more intermediate switches, a third message is sent to the source switch by the flow controller. The third message instructs the source switch to establish a connection between the source port and the established connection to the destination port along the identified routing path.

BRIEF DESCRIPTION OF THE DRAWINGS

The accompanying appendices and/or drawings illustrate various, non-limiting, examples, inventive aspects in accordance with the present disclosure.

DETAILED DESCRIPTION OF CERTAIN EMBODIMENTS

The present invention is now described more fully with reference to the accompanying drawings, in which illustrated embodiments of the present invention are shown wherein like reference numerals identify like elements. The present invention is not limited in any way to the illustrated embodiments as the illustrated embodiments described below are merely exemplary of the invention, which can be embodied in various forms, as appreciated by one skilled in the art. Therefore, it is to be understood that any structural and functional details disclosed herein are not to be interpreted as limiting, but merely as a basis for the claims and as a representative for teaching one skilled in the art to variously employ the present invention. Furthermore, the terms and phrases used herein are not intended to be limiting but rather to provide an understandable description of the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, exemplary methods and materials are now described. It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described below. One skilled in the art will appreciate further features and advantages of the invention based on the below-described embodiments. Accordingly, the invention is not to be limited by what has been particularly shown and described, except as indicated by the appended claims.

In exemplary embodiments, a computer system component may constitute a "module" that is configured and operates to perform certain operations as described herein below. Accordingly, the term "module" should be understood to encompass a tangible entity, be that an entity that is physically constructed, permanently configured (e.g., hardwired) or temporarily configured (e.g. programmed) to operate in a certain manner and to perform certain operations described herein.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

As used herein, a network element (e.g., a router, switch, bridge) is a piece of networking equipment, including hardware and software, that communicatively interconnects other equipment on the network (e.g., other network elements, end stations). Some network elements are "multiple services network elements" that provide support for multiple networking functions (e.g., routing, bridging, switching, Layer 2 aggregation, session border control, Quality of Service, and/or subscriber management), and/or provide support for multiple application services (e.g., data, voice, and video). Subscriber end stations (e.g., servers, workstations, laptops, netbooks, palm tops, mobile phones, smartphones, multimedia phones, Voice Over Internet Protocol (VOIP) phones, user equipment, terminals, portable media players, GPS units, gaming systems, set-top boxes) access content/services provided over the Internet and/or content/services provided on virtual private networks (VPNs) overlaid on (e.g., tunneled through) the Internet. The content and/or services are typically provided by one or more end stations (e.g., server end stations) belonging to a service or content provider or end stations participating in a peer to peer service, and may include, for example, public webpages (e.g., free content, store fronts, search services), private webpages (e.g., username/password accessed webpages providing email services), and/or corporate networks over VPNs. Typically, subscriber end stations are coupled (e.g., through customer premise equipment coupled to an access network (wired or wirelessly)) to edge network elements, which are coupled (e.g., through one or more core network elements) to other edge network elements, which are coupled to other end stations (e.g., server end stations).

A network element can be a multifunctional network element that integrates both a control plane and a data plane (sometimes referred to as a forwarding plane or a media plane) into the same network element. In the case that the network element is a router (or is implementing routing functionality), the control plane typically determines how data (e.g., packets) is to be routed (e.g., the next hop for the data and the outgoing port for that data), and the data plane is in charge of forwarding that data. For example, the control plane typically includes one or more routing protocols (e.g., Border Gateway Protocol (BGP), Interior Gateway Protocol(s) (IGP) (e.g., Open Shortest Path First (OSPF), Routing Information Protocol (RIP), Intermediate System to Intermediate System (IS-IS)), Label Distribution Protocol (LDP), Resource Reservation Protocol (RSVP)) that communicate with other network elements to exchange routes and select those routes based on one or more routing metrics.

Routes and adjacencies are stored in one or more routing structures (e.g., Routing Information Base (RIB), Label Information Base (LIB), one or more adjacency structures) on the control plane. The control plane programs the data plane with information (e.g., adjacency and route information) based on the routing structure(s). For example, the control plane programs the adjacency and route information into one or more forwarding structures (e.g., Forwarding Information Base (FIB), Label Forwarding Information Base (LFIB), and one or more adjacency structures) on the data plane. The data plane uses these forwarding and adjacency structures when forwarding traffic.

Each of the routing protocols downloads route entries to a main RIB based on certain route metrics (the metrics can be different for different routing protocols). Each of the routing protocols can store the route entries, including the route entries which are not downloaded to the main RIB, in a local RIB (e.g., an OSPF local RIB). A RIB module that manages the main RIB selects routes from the routes downloaded by the routing protocols (based on a set of metrics) and downloads those selected routes (sometimes referred to as active route entries) to the data plane. The RIB module can also cause routes to be redistributed between routing protocols.

A multifunctional network element can include a set of one or more line cards, a set of one or more control cards, and optionally a set of one or more service cards (sometimes referred to as resource cards). These cards are coupled together through one or more mechanisms (e.g., a first full mesh coupling the line cards and a second full mesh coupling all of the cards). The set of line cards make up the data plane, while the set of control cards provide the control plane and exchange packets with external network element through the line cards. The set of service cards can provide specialized processing (e.g., Layer 4 to Layer 7 services (e.g., firewall, IPsec, IDS, P2P), VoIP Session Border Controller, Mobile Wireless Gateways (GGSN, Evolved Packet System (EPS) Gateway)).

Unlike a monolithic network architecture that requires complex network management functions to be distributed in the control planes of multifunctional network elements throughout the network, and require complex data and control planes integrated into the same multifunctional network element, a flow-based, split-architecture network allows the data planes of the network to be separated from the control planes. Data planes can be implemented as simple discrete flow switches distributed throughout the network, and the control planes with the network's intelligence are implemented in a flow controller that oversees the flow switches. By decoupling the control function from the data forwarding function, the split architecture eases the task of modifying the network control logic and provides a programmatic interface upon which developers can build a wide variety of new protocols and management applications. This allows the data and control planes to evolve and scale independently, while reducing the cost of the data plane network components.

FIG. 1 illustrates an exemplary flow-based, split-architecture network 100. A flow-based, split-architecture network will simply be referred to as a "split-architecture network." The split-architecture network 100 has a plurality of flow switches 120A-M that is controlled by a flow controller 110. The plurality of flow switches 120A-M is networked together for the purpose of receiving data packets from one or more external network elements (which may also be referred to, interchangeably, as external source) and for distributing these data packets to one or more external network elements (which may also be referred to, interchangeably, as external destination). In FIG. 1, the external source and external destination are depicted as network elements 102 and 104, respectively. The flow controller 110 and the flow switches 120A-M can communicate and exchange information using a protocol (e.g., OpenFlow protocol). In the split-architecture network 100, the flow controller 110 collects information from the flow switches 120A-M, and a path selection module 112 in the flow controller 110 controls establishment of a communications path and distributes the appropriate forwarding decisions to the flow switches 120A-M.

Each of the flow switches 120A-M has a forwarding table that is updated and maintained by the flow controller 110. The forwarding table in each flow switch has a set of flow entries that are each associated with a particular flow. Each flow entry includes a set of match fields that are used to identify packets belonging to the particular flow that is associated with the flow entry. Each flow entry also has a set of actions that the particular flow switch is to perform on packets that matches the flow entry. When an incoming packet matches a particular flow entry (i.e. the packet has header, port, and other information matching the match fields in one of the flow entries in the forwarding table), the packet is identified as belonging to the flow that is associated with the flow entry, and the associated set of actions are performed on the packet and all subsequent packets of the flow. The set of actions can include changing portions of the packet header information and forwarding out the packet on a particular port towards the next flow switch along the identified flow path. Each flow entry also has a set of statistics associated with the particular flow, such as various packet counters.

A flow switch in a split-architecture network can perform three different roles based on its location with respect to a flow in the split-architecture network—ingress flow switch, egress flow switch, and internal (which may also be referred to, interchangeably, as intermediate) flow switch. Typically, a traffic flow enters a split-architecture network through an ingress port (a port which receives traffic from the external source 102) of an ingress flow switch (which may also be referred to, interchangeably, as a source switch), passes through the split-architecture network domain through internal flow switches, and exits the domain through an egress port (a port which transmits traffic to the external destination 104) of the egress flow switch which may also be referred to, interchangeably, as a destination switch). A "path" is a collection of cross-switch links, which can be dedicated physical links connecting one physical flow switch to another physical flow switch. A path is designated herein as a sequence of switches between an ingress flow switch and an egress flow switch. A single flow switch can serve multiple roles for different flows. For example, a single flow switch can be an ingress flow switch for one flow, an internal flow switch for a different flow, and/or an egress flow switch for another flow. An internal flow switch, in the context of a connection, is any switch, other than the ingress switch, that forwards data packets, directly or indirectly (i.e., through another internal flow switch) to the egress flow switch. Generally, an internal flow switch may also be an egress switch if it has egress ports located on it. In other words, any switch can be both a forwarding conduit and a final destination.

In one embodiment, each flow from an ingress to an egress switch is configured/programmed by a user (i.e., network administrator) via flow entries in forwarding tables. To facilitate the processing of packets that do not match any of the programmed flow entries, the forwarding table of each flow switch 120A-M has a default entry with a default action that is to either send a packet that does not match any programmed flow entries to the flow controller 110 or to drop that packet. The default entry is reached when the flow switch has searched through all the programmed flow entries in its forwarding table and determined that the packet does not match any of the programmed flow entries. In this embodiment if the default entry is reached, the packet is simply dropped.

By way of example, the flow path for a new flow, FLOW A, is made up of flow switches 120A through 120G in order. This new flow is to enter the split-architecture network 100 at ingress flow switch 120A and traverse through flow switches 120B-G. This new flow exits the split-architecture network 100 at flow switch 120G, and hence, flow switch 120G is the egress flow switch for FLOW A. When the flow controller 110 assigns this flow path to FLOW A, the flow controller 110 prepares all devices along the flow path by configuring each of the flow switches 120A-G to have a flow entry associated with FLOW A in their respective forwarding tables. As a result each forwarding table associated with the flow switches 120A-G has a flow entry that is associated with FLOW A. According to embodiments of the present invention, prior to sending data, the messaging protocol employed by the flow controller 110 ensures that all "downstream" communication paths are established and correct, as described below in conjunction with FIG. 2. In this manner, when each of the flow switches 120A-G receives a packet belonging to FLOW A, the flow switch can look up the set of actions in the flow entry that is associated with FLOW A to correctly forward the packet along the identified flow path selected and assigned to FLOW A by the flow controller 110.

Once the flow controller 110 has programmed the flow entries in the forwarding tables of the flow switches 120A-G for FLOW A and once a corresponding connection has been established, when a packet belonging to FLOW A enters the split-architecture network 100 at the ingress flow switch 120A, the ingress flow switch 120A performs a lookup of a set of match fields (e.g., header and port information) in the packet to determine if the match fields of the packet matches any of the programmed flow entries in the forwarding table of the ingress flow switch 120A. The ingress flow switch 120A determines that a matching entry is found because the flow controller 110 has previously programmed a flow entry for FLOW A in its forwarding table. The flow entry for FLOW A includes a set of actions that the ingress flow switch 120A should perform on the packet to correctly forward the packet along the identified flow path for FLOW A. The ingress flow switch 120A then performs these actions and forwards the packet to flow switch 120B according to the set of actions in the flow entry for FLOW A in its forwarding table. When the flow switch 120B receives this packet, the flow switch 120B performs a lookup in its forwarding table and forwards the packet accordingly along the determined flow path for FLOW A. This process repeats at each flow switch 120A-G along the identified flow path for FLOW A.

There are known split-architecture network systems and methods in which a centralized flow control unit includes a function that sends two control messages and receives corresponding acknowledgments to and from all devices making up the identified communications path. The first message prepares all devices and the second one establishes the connection. However, with only two messages, intermediate temporary communication paths could be established that were incorrect (i.e., blocked paths, broken connections or incorrect egress ports).

Figure 2:
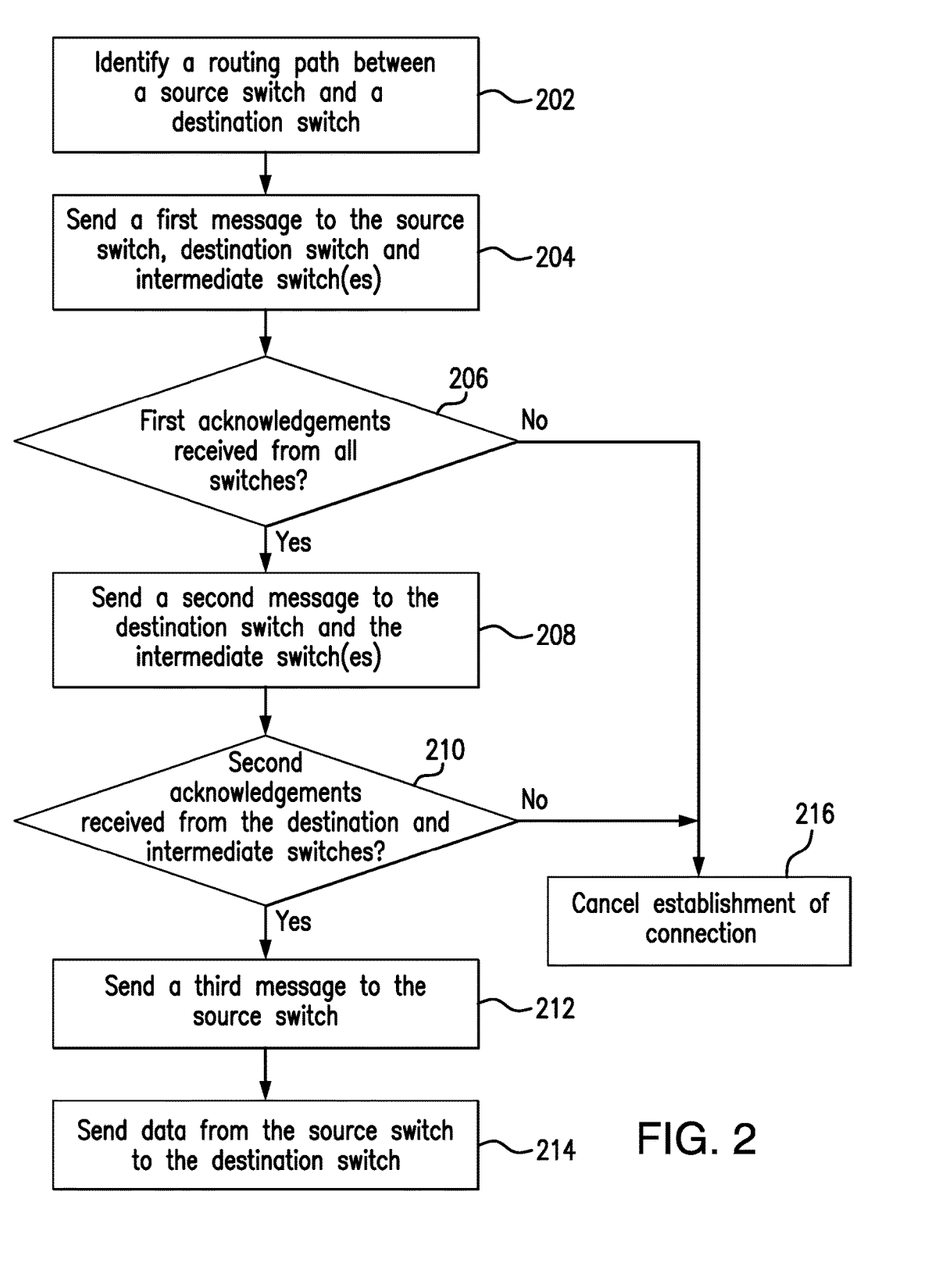
FIG. 2 is a flowchart of operational steps for establishing a communications path performed by the path selection module of FIG. 1, in accordance with an illustrative embodiment of the present invention.

FIG. 2 is a flowchart of operational steps for an enhanced method of establishing a communications path performed by the path selection module of FIG. 1, in accordance with exemplary embodiments of the present invention. Before turning to description of FIG. 2, it is noted that the flow diagram shown therein is described, by way of example, with reference to components shown in FIG. 1, although these operational steps may be carried out in any system and are not limited to the scenario shown in the aforementioned figure. It should be appreciated that in some embodiments some of the steps described below may be combined into a single step. In some embodiments, one or more additional steps may be included.

As noted above, systems and methods exist that use two control messages for establishment of a communication path. FIG. 2 illustrates an enhanced solution that utilizes an additional third control message to substantially eliminate the possibility of any data leakage. For exemplary purposes only, and without limitation, the following describes particular information that may be communicated by messaging protocol infrastructure described below.

In one embodiment of the present invention, the three messages sent by the flow controller 110 may comprise different types of a connection message with at least three different command codes. Each command code may correspond to a particular stage of path establishment process, such as prepare, execute and cleanup/cancel stages.

In addition to the command code, in one example, the connection message can comprise the following fields: ingressPort, nConnections, nXsls, bandwidth, connections, xSLs (cross-switch links). The command code field can indicate which commands should be performed by the recipient switches. The ingress port field can identify the ingress port receiving data packets to be routed through the split-architecture domain 100. The nConnections field and nXsls field can have the number of separate connections to be made with this connection message and the number of cross-switch links (xSLs) to be used to make the aforementioned connections, respectively. The cross-switch links are used to carry forwarded traffic from one switch to the next in any given flow. Each connection specifies one or more egress ports. If flow switches are implemented using blade-based switching architecture, the bandwidth field may be used in the connection message. The blade-based switching architecture may include one or more multi-switch chassis. As used herein, the term "multi-switch chassis" refers to a switch architecture that includes a chassis, backplane, and other circuitry (e.g., power supply, a centralized chassis controller, or the like) for enabling use of a plurality of switches. The bandwidth field may be used to indicate the data rate of the ingress port. In other words, the bandwidth field may be used by a message recipient switch for routing data between blades within a single multi-switch chassis over the backplane. The connections field and xSLs field can have an array of connection specifications and an array of xSL specifications to be used in making the connections specified in this connection message, respectively. These arrays will be described in greater detail below.

A single connection specification (within each array of specifications) of the traffic flow defines a connection between the ingress port and one or more egress ports. In some embodiments, there is a connection specification to define the data flow for data packets that are not filtered (if any) and an additional connection specification for each unique filter applied to the data packets received on the ingress port (if any).

In one example, the connection specification can comprise the following fields: connectionId, groupId, filterId, filterPrecedence, nEgressGroups, egressGroups and filterString. The connectionId field can identify a particular connection, so that each switch can reference it in the future for connection modification or connection deletion purposes. The groupId field can uniquely identify all data packets of a traffic session received from the ingress port associated with this particular connection, so that the switch can route the identified group of data packets through the domain to the final egress port(s). The filterId field could be used to specify an optional specific filter to be applied to packets at the ingress port (e.g., to drop unwanted data packets). The filterPrecedence field value can identify a particular order in which filters should be applied if these filters are associated with multiple connections. The nEgressGroups field can identify the number of specific groups of egress ports to which the data packets are to be sent for this particular connection. The egressGroups field could be used as egress group specification, discussed in greater detail below, for specifying both each egress port to which data packets are routed and, more particularly, specifying the distribution of data packets to the ports within each group. The filterString value can be a text string specifying the filter to be applied to the data packets received by the ingress port. To filter packets, the packets received through the ingress port are examined by the ingress switch prior to the packets (that pass the filter criteria) being sent out to the egress ports in the established connection.

According to an embodiment of the present invention, an egress group specification which can be included in the connection specification may include one or more groups of egress ports (egress groups) to which data packets are sent for transmission to one or more external destinations, such as the destination device 104 in FIG. 1. The egress groups field also helps a flow switch to determine for each egress group how data packets are distributed among the egress ports in the group. According to the current embodiment, the following types of fields may be included in the egressGroups specification: egressGroupType, nPorts and egressPorts. The egressGroupType can specify whether data packets sent to this egress group should be multicast (e.g., each data packet is transmitted through each port in the group) or load balanced (e.g., each data packet is transmitted through just one port in the group based upon a distribution algorithm). The nPorts field could be used to specify the number of ports used in this egress group. The egressPorts value can be an array that identifies the egress ports that make up this example egress group.

As another non-limiting example, the xSLs field can have an array of xSL specifications to be used in making each connection specified in the context of this connection message. According to an embodiment of the present invention, the content of an xSL specification provides information related to an end-to-end path, such as the path from the ingress switch 120A through any inner switches 120B-120F to the egress switch 120G. In one non-limiting example, such information may consist of one or more link hops (segments of the connection path), each identified by the specific cross-switch link ports terminating each end of the hop. In other words, an xSL specification may comprise the number of individual segments comprising this end-to-end cross-switch link path and an array of hop specifications described below.

According to an embodiment of the present invention, the xSL hop specification may identify the specific port (or ports in the case of links within aggregated trunks between aggregated switches) on each end of the hop. This information indicates to each switch (i.e., flow switches 120A-120F) a desired data flow to the next switch (next hop) in the data flow path. In one embodiment, the xSL hop specification may include one or more fields specifying either a predefined next cross-switch link hop for the path using a trunk number or, alternatively, identifying the ports at each end of the next hop for forwarding the packets onward to the next hop. It should be noted that such predefined next cross-switch link hop may be configured by the path selection module 112 with a separate message that enables translation of a received trunk number to the switch-to-switch link endpoints corresponding to a respective hop along the path from the source switch (i.e., switch 120A) to the destination switch (i.e., switch 120G).

Referring now to FIG. 2, at 202, the path selection module 112 preferably identifies a potential path between the ingress flow switch 120A and the egress flow switch 120G using, for example, learned topology of the network 100. The topology can be learned through the exchange of link state advertisements conforming to OSPF protocol. The OSPF is an interior gateway routing protocol. OSPF (defined in RFC 2328) is a link-state protocol in which a router broadcasts its neighbors' link-state information to all the nodes in the routing domain. Using this information the flow controller 110 constructs the topology map of the entire network. In some embodiments, the flow controller 110 maintains a link-state database which reflects the entire network topology. Note that, in the same manner as in the conventional network control, the flow controller 110 can calculate the shortest path based on a well-known Dijkstra's algorithm (Single Source Shortest Path Algorithm). Typically, the main basis for selecting a path is path cost, which can be specified in terms of a number of hops between nodes, or by some other metric such as bandwidth of links connecting nodes, or both.

At step 204, the path selection module 112 may send a first connection message to the source switch 120A, destination switch 120G and the intermediate switches 120B-120F. In this case, a prepare command may be indicated in the command code of the connection message. The types of fields that may be included in this connection message are discussed above. This first connection message prepares all relevant devices to make the identified connection.

In accordance with at least some embodiments of the present invention, the path selection module 112 may be adapted to evaluate success of the first message (step 206). In one embodiment, the path selection module 112 may confirm receiving within a predetermined period of time acknowledgments (confirmations) from all the intended recipient switches associated with the first message, more specifically, the source switch 120A, destination switch 120G and the intermediate switches 120B-120F.

In response to receiving all expected acknowledgments, at step 208, the path selection module 112 sends a second connection message this time only to the destination switch 120G and the intermediate switches 120B-120F. In this case, an execute command may be indicated in the command code of the connection message. In other words, the path selection module 112 determines the flow entries that need to be programmed in the underlying flow switches for this particular flow and programs these flow entries in the respective flow switches, using the second connection message. The types of fields that may be included in this connection message are discussed above. In summary, a successful second message sent by the path selection module 112 establishes the communications paths on all devices except the source switch 120A.

Next, the path selection module 112 evaluates success of the second message (step 210). In one embodiment, the path selection module 112 may confirm receiving acknowledgments from the destination switch 120G and from each of the intermediate switches 120B-120F. These acknowledgments indicate that the identified communications path has been established on all devices making up the path, except the source switch 120A.

In response to receiving all expected acknowledgments within a predetermined period of time, at step 212, the path selection module 112 sends a third connection message, this time only to the source switch 120A. In this case, the command code of the connection message may indicate an execute command yet again. The types of fields that may be included in this connection message are discussed above. For example, the content of an xSL specification provides the source switch 120A information related to an end-to-end path, such as the path from the ingress switch 120A through any inner switches 120B-120F to the egress switch 120G. The third message effectively connects the source port of the source switch 120A to the communication path established in step 208. Upon success, at step 214, the path selection module 112 starts data transfer phase. During the data transfer phase, data is transmitted from the source switch 120A to the destination switch 120G along the established connection, which includes the port-to-port connections of the switches (cross-switch links). After a certain amount of time, or at the occurrence of a certain event, the connection enters the termination phase, in which the connection is terminated by the path selection module 112 (via a separate "cleanup" message), and the network elements which made up the connection are freed to support other connections. In other words, after the source switch 120A responds successfully to the third message (e.g., via a third acknowledgment message), the path selection module 112 sends a "clean up" message that releases resources associated with processing the first three messages or a now obsolete previous connection.

According to an embodiment of the present invention, if either the first message (sent at step 204) or the second message (sent at step 208) fails (decision blocks 206 and 210, "No" branches), at step 216, the path selection module 112 cancels establishment of the connection. In other words, at 216, the path selection module 112 sends a cancellation message to all the switches involved in the establishment of the connection, thusly cancelling the connection request for establishing the identified data transmission path when the acknowledgment (confirmation) message is not received from at least one switch involved in the path establishment within the predetermined period of time. The cancellation message also releases all of the network elements which made up the intended connection. The primary difference between this cancellation message and the "clean up" message mentioned above, is that the cleanup message does not cancel establishment of the just made connection.

In summary, there are known network systems and methods in which two control messages are used for establishment of a communications path. However, with only two messages, intermediate temporary communication paths could be established that were incorrect (i.e., blocked paths, broken connections or incorrect egress ports). Various embodiments of the present invention provide an improved path configuration method that advantageously splits the second protocol control message into two separate messages, one being transmitted to all network elements except the one on which the source port resides and a second message being transmitted exclusively to the device hosting the source port. This prevents traffic from being transmitted to one or more unauthorized network elements. Thus, since data traffic can't be forwarded to the wrong devices, any implementation of the particular routing protocol described above should substantially eliminate a possibility of data leakage.

FIG. 1 is a diagram of computer network using a split-architecture layout, however, the various embodiments of the present invention are not so limited. The described above messaging protocol can be used by any set of network routing devices that actively cooperate for establishing a communications path. Additionally, embodiments of the present invention can be utilized by the flexible routing capabilities of Software Defined Networks (SDN) using an open source control plane. In such an environment these cooperating network routing devices can comprise, for example, a hierarchy of various commodity white box devices connecting various host devices or other resources to an external network.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 3:
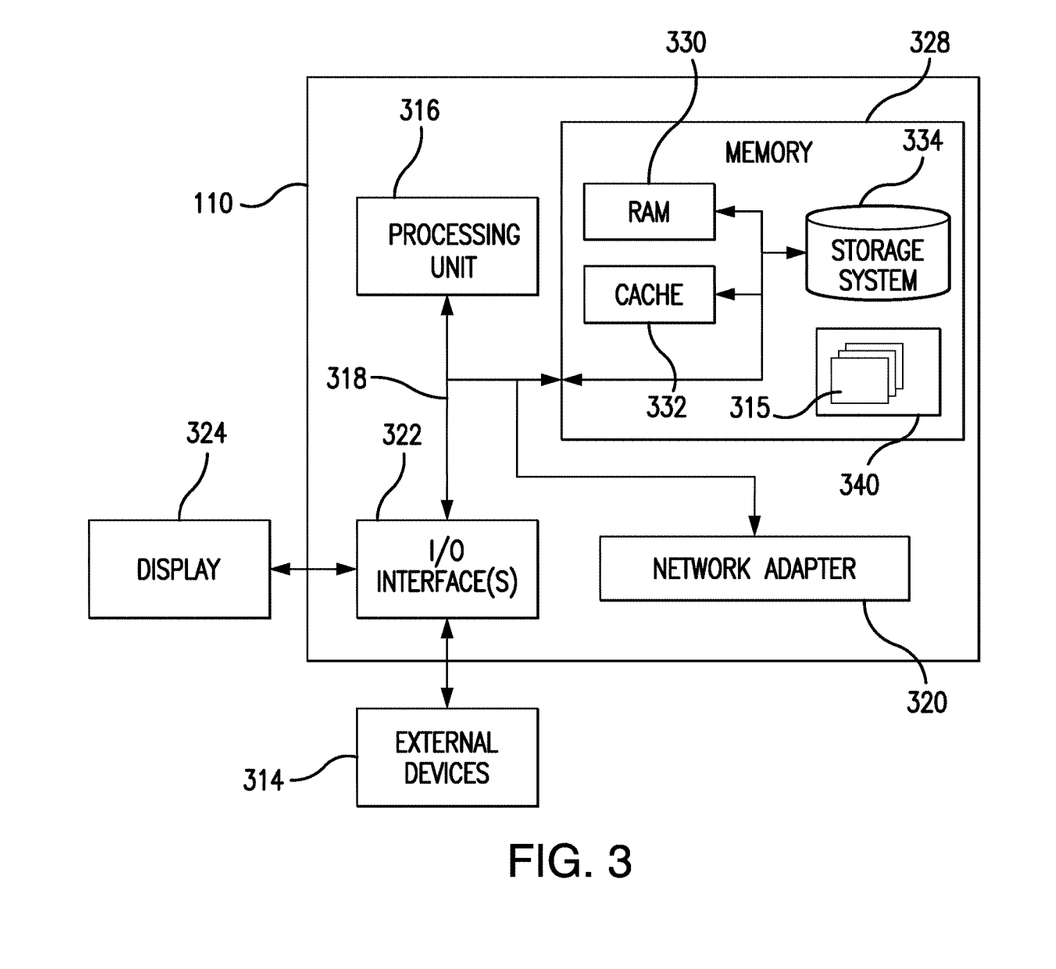
FIG. 3 illustrates internal and external components of a flow controller device in accordance with illustrative embodiments of the present invention.

Embodiments of the network monitoring system may be implemented or executed by one or more computer systems. One such computer system, the flow controller 110 is illustrated in FIG. 3. In various embodiments, flow controller 110 may be a server, a distributed computer system, a workstation, a network computer, a desktop computer, a laptop, or the like.

Flow controller 110 is only one example of a suitable system and is not intended to suggest any limitation as to the scope of use or functionality of embodiments of the invention described herein. Regardless, flow controller 110 is capable of being implemented and/or performing any of the functionality set forth hereinabove.

Flow controller 110 is operational with numerous other general purpose or special purpose computing system environments or configurations. Examples of well-known computing systems, environments, and/or configurations that may be suitable for use with the flow controller 110 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed data processing environments that include any of the above systems or devices, and the like.

The components of the flow controller 110 may be described in the general context of computer system-executable instructions, such as program modules, being executed by a computer system. Generally, program modules may include routines, programs, objects, components, logic, data structures, and so on that perform particular tasks or implement particular abstract data types. Flow controller 110 may be practiced in distributed data processing environments where tasks are performed by processing devices that are linked through a communications network. In a distributed data processing environment, program modules may be located in both local and remote computer system storage media including memory storage devices.

The flow controller system 110 is shown in FIG. 3 in the form of a general-purpose computing device. The components of flow controller 110 may include, but are not limited to, one or more processors or processing units 316, a system memory 328, and a bus 318 that couples various system components including system memory 328 to processor 316.

Bus 318 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Flow controller 110 typically includes a variety of computer system readable media. Such media may be any available media that is accessible by flow controller 110, and it includes both volatile and non-volatile media, removable and non-removable media.

System memory 328 can include computer system readable media in the form of volatile memory, such as random access memory (RAM) 330 and/or cache memory 332. Flow controller 110 may further include other removable/non-removable, volatile/non-volatile computer system storage media. By way of example only, storage system 334 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 318 by one or more data media interfaces. As will be further depicted and described below, memory 328 may include at least one program product having a set (e.g., at least one) of program modules that are configured to carry out the functions of embodiments of the invention.

Program/utility 340, having a set (at least one) of program modules 315 (such as path selection module 112) may be stored in memory 328 by way of example, and not limitation, as well as an operating system, one or more application programs, other program modules, and program data. Each of the operating system, one or more application programs, other program modules, and program data or some combination thereof, may include an implementation of a networking environment. Program modules generally carry out the functions and/or methodologies of embodiments of the invention as described herein.

Flow controller 110 may also communicate with one or more external devices such as a keyboard, a pointing device, a display, etc.; one or more devices that enable a user to interact with flow controller 110; and/or any devices (e.g., network card, modem, etc.) that enable flow controller 110 to communicate with one or more other computing devices. Such communication can occur via Input/Output (I/O) interfaces 322. Still yet, flow controller 110 can communicate with one or more networks such as a local area network (LAN), a general wide area network (WAN), and/or a public network (e.g., the Internet) via network adapter 320. As depicted, network adapter 320 communicates with the other components of flow controller 110 via bus 318. It should be understood that although not shown, other hardware and/or software components could be used in conjunction with flow controller 110. Examples, include, but are not limited to: microcode, device drivers, redundant processing units, external disk drive arrays, RAID systems, tape drives, and data archival storage systems, etc.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method in a switching network for establishing a communication path, the method comprising:
   identifying, in a flow controller, a routing path between a source port on a source switch in communication with an external source node and a destination port on a destination switch in communication with an external destination node;
   sending, by the flow controller, a first message to the source switch and the destination switch, the first message instructs the source switch and the destination switch to prepare for establishing a connection;
   sending, by the flow controller, a second message to the destination switch responsive to receiving first acknowledgment messages from the source switch and the destination switch, the second message instructs the destination switch to establish a connection along the identified routing path;
   sending, by the flow controller, a third message to the source switch responsive to receiving second acknowledgment message from the destination switch, the third message instructs the source switch to establish a connection between the source port and the established connection along the identified routing path; and
   sending, by the flow controller, a fourth message to the source switch and the destination switch responsive to a failure to receive the first acknowledgment messages from the source switch and the destination switch, the fourth message instructs the source switch and the destination switch to cancel establishment of the connection.

2. The method as recited in claim 1, further comprising sending data from the source port on the source switch to the destination port on the destination switch using the established connection.

3. The method as recited in claim 1, further comprising sending, by the flow controller, a fourth message to the source switch and the destination switch responsive to a failure to receive the second acknowledgment message from the destination switch, the fourth message instructs the source switch and the destination switch to cancel establishment of the connection.

4. The method as recited in claim 1, further comprising sending, by the flow controller, a fifth message to the source switch and the destination switch responsive to receiving third acknowledgment message from the source switch, the fifth message instructs the source switch and the destination switch to release resources associated with the establishment of the connection.

5. A method in a switching network including a plurality of switches for establishing a communication path, the method comprising:
   identifying, in a flow controller, a routing path between a source port on a source switch in communication with an external source node and a destination port on a destination switch in communication with an external destination node, the path extending from the source switch to the destination switch through one or more of intermediate switches;
   sending, by the flow controller, a first message to the source switch, the destination switch and the one or more intermediate switches, the first message instructs the source switch, the destination switch and the one or more intermediate switches to prepare for establishing a connection;
   sending, by the flow controller, a second message to the destination switch and the one or more intermediate switches responsive to receiving first acknowledgment messages from the source switch, the destination switch and each of the one or more intermediate switches, the second message instructs the destination switch and the one or more intermediate switches to establish a connection along the identified routing path; and
   sending, by the flow controller, a third message to the source switch responsive to receiving second acknowledgment messages from the destination switch and each of the one or more intermediate switches, the third message instructs the source switch to establish a connection between the source port and the established connection along the identified routing path wherein the first, second and third messages include information indicative of the source port, data rate of the source port, and a number of distinct cross-switch connections to be established between the switches.

6. The method as recited in claim 5, further comprising sending data from the source port on the source switch to the destination port on the destination switch using the established connection.

7. The method as recited in claim 5, further comprising sending, by the flow controller, a fourth message to the source switch, the destination switch and the one or more intermediate switches responsive to a failure to receive the first acknowledgment messages from the source switch, the destination switch and from each of the one or more intermediate switches, the fourth message instructs the source switch, the destination switch and the one or more intermediate switches to cancel establishment of the connection.

8. The method as recited in claim 5, further comprising sending, by the flow controller, a fourth message to the source switch, the destination switch and the one or more intermediate switches responsive to a failure to receive the second acknowledgment messages from the destination switch and from each of the one or more intermediate switches, the fourth message instructs the source switch, the destination switch and the one or more intermediate switches to cancel establishment of the connection.

9. The method as recited in claim 5, further comprising sending, by the flow controller, a fifth message to the source switch, the destination switch and the one or more intermediate switches responsive to receiving third acknowledgment message from the source switch, the fifth message instructs the source switch, the one or more intermediate switches and the destination switch to release resources associated with the establishment of the connection.

10. The method as recited in claim 5, wherein the first, second and third messages further include one or more cross-switch link specifications defining the routing path extending from the source switch to the destination switch through the one or more intermediate switches.

11. A system in a switching network for automatically establishing a communication path, the system comprises:
  a source switch having a source port operatively coupled to an external source node;
  a destination switch having a destination port operatively coupled to an external destination node; and
  a flow controller operatively coupled to the source switch and the destination switch, the flow controller having a memory and a processor disposed in communication with the memory, and configured to issue a plurality of instructions stored in the memory, wherein the instructions issue signals to:
    identify a routing path between the source port and the destination port;
    send a first message to the source switch and the destination switch, the first message instructs the source switch and the destination switch to prepare for establishing a connection;
    send a second message to the destination switch responsive to receiving first acknowledgment messages from the source switch and the destination switch, the second message instructs the destination switch to establish a connection along the identified routing path; and
    send a third message to the source switch responsive to receiving second acknowledgment message from the destination switch, the third message instructs the source switch to establish a connection between the source port and the established connection along the identified routing path; and
    issue signals to send a fourth message to the source switch, the destination switch and the one or more intermediate switches responsive to a failure to receive the first acknowledgment messages from the source switch, the destination switch and from each of the one or more intermediate switches, the fourth message instructs the source switch, the destination switch and the one or more intermediate switches to cancel establishment of the connection.

12. The system as recited in claim 11, further comprising one or more intermediate switches operatively coupled to the source switch, the destination switch and the flow controller, the one or more intermediate switches operatively interconnected with each other and operatively coupled to the source switch and destination switch by a plurality of cross-switch links.

13. The system as recited in claim 12, wherein the identified path extends from the source switch to the destination switch through the one or more intermediate switches.

14. The system as recited in claim 12, wherein the instructions to send a first message further issue signals to send the first message to the one or more intermediate switches, the first message instructs the one or more intermediate switches to prepare for establishing a connection.

15. The system as recited in claim 14, wherein the instructions to send a second message further issue signals to send the second message to the one or more intermediate switches responsive to receiving first acknowledgment messages from the source switch, the destination switch and the one or more intermediate switches, the second message instructs the one or more intermediate switches to establish a connection along the identified routing path.

16. The system as recited in claim 15, wherein the instructions to send a third message further issue signals to send the third message to the source switch responsive to receiving second acknowledgment messages from the destination switch and the one or more intermediate switches.

17. The system as recited in claim 11, wherein the instructions further issue signals to send a fifth message to the source switch, the destination switch and the one or more intermediate switches responsive to receiving third acknowledgment message from the source switch, the fifth message instructs the source switch, the one or more intermediate switches and the destination switch to release resources associated with the establishment of the connection.

* * * * *